United States Patent [19]

Wennerstrom

[11] 4,318,669
[45] Mar. 9, 1982

[54] VANE CONFIGURATION FOR FLUID WAKE RE-ENERGIZATION

[75] Inventor: Arthur J. Wennerstrom, Montgomery County, Ohio

[73] Assignee: The United States of America as represented by the Secretary of the Air Force, Washington, D.C.

[21] Appl. No.: 110,146

[22] Filed: Jan. 7, 1980

[51] Int. Cl.³ .............................................. F01D 9/00
[52] U.S. Cl. .................................... 415/119; 415/216; 60/751
[58] Field of Search ............... 416/228, 235; 415/209, 415/210, 211, 212 R, 216, 119, DIG. 1, 208; 60/751, 39.36, 39.37; 138/37

[56] References Cited

U.S. PATENT DOCUMENTS 2,540,526  2/1951  Howell ............................... 60/39.37
3,935,704  2/1976  Barnes ............................... 60/226 R
4,089,618  5/1978  Patel .................................... 416/228

FOREIGN PATENT DOCUMENTS 719758   2/1932  France ................................. 415/119
2403474  9/1977  France ................................. 415/119
14668    of 1912 United Kingdom ......... 415/DIG. 1

Primary Examiner—Robert E. Garrett
Attorney, Agent, or Firm—Donald J. Singer; Richard J. Killoren

[57] ABSTRACT

An airfoil for use in an axial flow compressor, a high-bypass turbofan or as a turning vane in an airflow duct having a crenelated trailing edge. The crenelated trailing edge produces pairs of counterrotating vortices which promote rapid mixing between the low momentum fluid, in the wake of the airfoil, and the adjacent fluid streams. The mixing of the adjacent streams with the low momentum wake acts to re-energize the wake.

4 Claims, 8 Drawing Figures

VANE CONFIGURATION FOR FLUID WAKE RE-ENERGIZATION

RIGHTS OF THE GOVERNMENT

The invention described herein may be manufactured and used by or for the Government of the United States for all governmental purposes without the payment of any royalty.

BACKGROUND OF THE INVENTION

This invention relates to an apparatus for re-energization of the wake of a vane, such as an airfoil, to accelerate dissipation of fluid wakes.

The patents to Hoadley, U.S. Pat. No. 2,650,752; Stephens, U.S. Pat. No. 2,800,291; and my patent, U.S. Pat. No. 4,076,454, relate to apparatus for use in boundary layer control. The patent to Crook, U.S. Pat. No. 1,724,456, relates to aerodynamic control to influence the flow across the wing. The patent to Quinn, U.S. Pat. No. 3,834,834, relates to the use of jets of alternating direction to increase mixing between adjacent streams. My copending patent application, "Mixing Nozzle Trailing Edge Structure", Ser. No. 06/94,622 filed Nov. 15, 1979, now abandoned, relates to mixing a core flow of a turbofan engine with the bypass flow.

Any object placed in a fluid stream produces a wake. If this object is a vane which changes the direction of the fluid stream, it becomes a lifting surface and produces a larger wake because of the increased diffusion occurring on the leeward side. commonly called the suction surface. If, in addition to turning the fluid stream, the vane is in a region of diffusion, the wake will be still larger. This wake consists of fluid of low momentum relative to the vane creating it.

In high-bypass turbofans, it is now common to employ a large streamwise gap between the fan rotor and the following stator vanes in order to minimize the noise produced by the stator vanes chopping the rotor wake.

Also the last stator vane row in an axial compressor, used in an aircraft gas turbine, is followed by a close coupled diffuser and the combustor. Due to the limit on aerodynamic loading of the vanes, more vane rows are required than would be required if the low momentum flow in the wake were not present.

BRIEF SUMMARY OF THE INVENTION

According to this invention, a vane configuration is provided for use in an axial flow compressor, a high bypass turbofan or as a turning vane in an airflow duct. The vane is provided with a crenelated trailing edge to provide counterrotating vortices to promote rapid mixing of the low momentum fluid in the vane wake with the adjacent fluid streams.

IN THE DRAWING

DETAILED DESCRIPTION OF THE INVENTION

Figure 1:
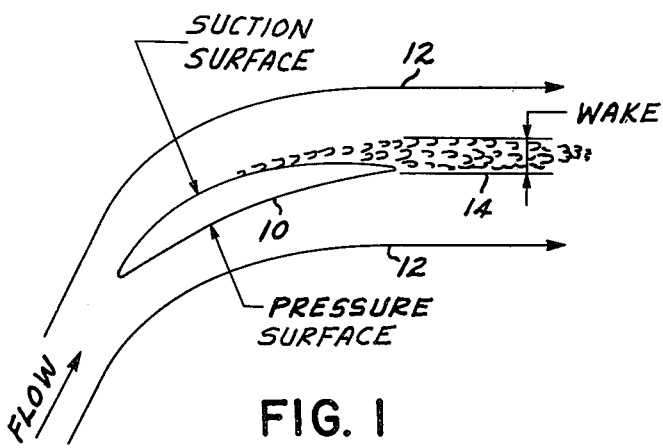
FIG. 1 is a schematic view showing the fluid flow around a vane.

Reference is now made to FIG. 1 of the drawing which shows a vane 10 in an airflow as indicated by flow lines 12 with the pressure and suction surfaces as illustrated. The vane 10 produces a wake of low momentum fluid, indicated at 14.

Figure 2:
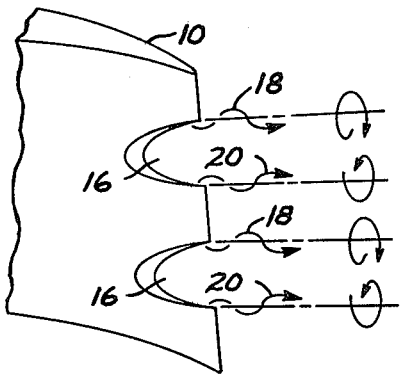
FIG. 2 shows a modification of the device of FIG. 1 to provide a crenelated trailing vane edge.

By providing crenelated vane trailing edge, as indicated at 16 in FIG. 2, the counterrotating vortices 18 and 20 promote rapid mixing of the low momentum fluid, in the vane wake 14, with the adjacent high momentum fluid streams.

Figure 3:
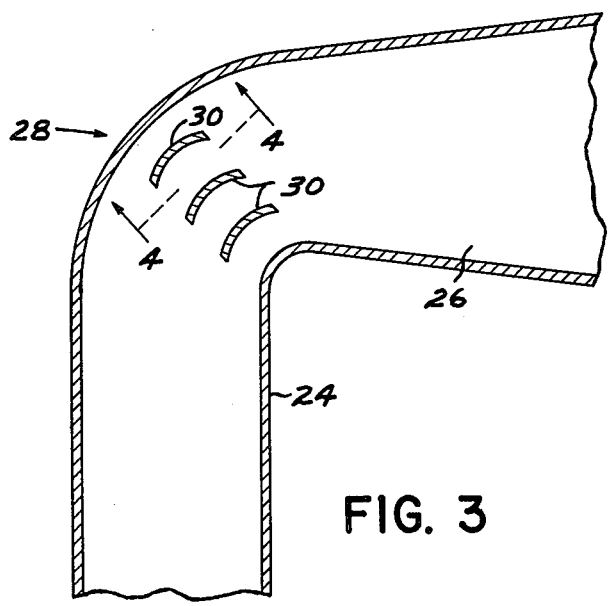
FIG. 3 is a partially schematic diagram of an air flow duct with an elbow and diffuser.

In a conventional heating or air conditioning duct, such as shown at 24 in FIG. 3, having a diffusing section 26 placed immediately downstream of an elbow 28, containing turning vanes 30, will result in greater total pressure or head loss than the sum of the individual component losses used separately.

Figure 4:
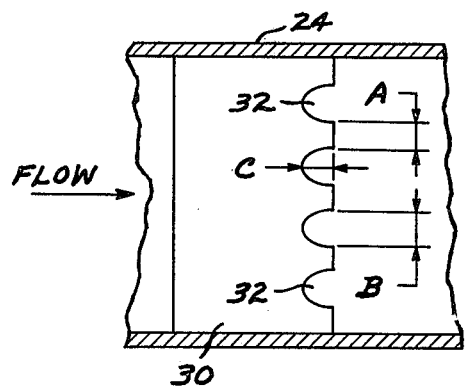
FIG. 4 is a view along the line 4—4 of FIG. 3.

If the trailing edges of the vanes 30 have crenelations 32, as shown in FIG. 4, the feedback from the diffuser will be reduced resulting in lower overall head loss which will be much closer to the sum of the pressure and head losses resulting from the components used individually.

The vanes 30 can be made by conventional die cutting or stamping methods.

For maximum wake reenergization the dimensions A, B and C, shown in FIG. 4, should not differ by a factor greater than two and they could be made approximately equal. The dimension C should lie between 5 and 20 percent of the vane chord length.

Figure 5:
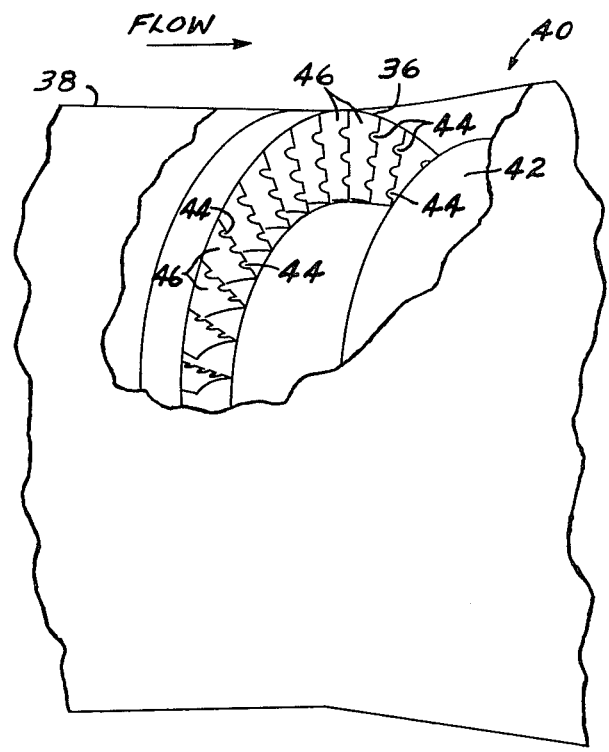
FIG. 5 is a schematic diagram showing a stator row in an axial flow compressor modified according to the invention.
Figure 6:
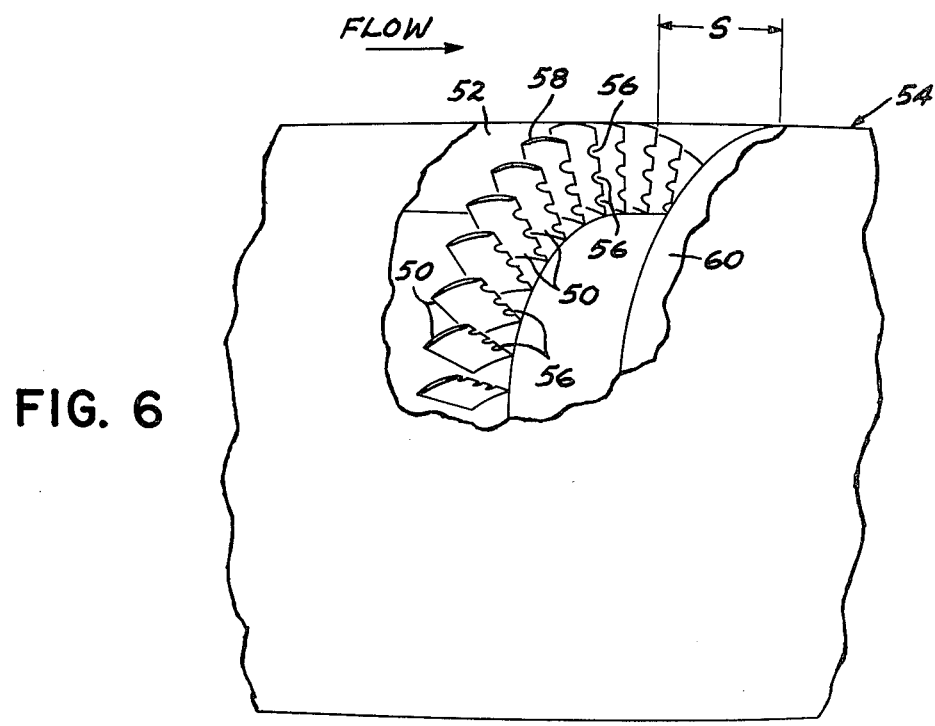
FIG. 6 is a schematic diagram of a rotor in a turbofan duct modified according to the invention.

The last stator vane row, such as indicated at 36, in FIG. 5, in an axial flow compressor, indicated at 38, is followed by a close coupled diffuser 40 and the inlet 42 of a combustor. By providing crenelations 44 in the stator vanes 46, reenergization of the vane wakes will result. This will permit higher aerodynamic loading followed by rapid diffusion so that one or more vane rows can be eliminated in the compressor. This will reduce the length and weight of the compressor and diffuser.

It is now common, in high-bypass turbofans, to employ a large streamwise gap between the fan rotor and the following stator vanes in order to minimize the noise produced by the stator vanes chopping the rotor wakes. In addition to a possible weight penalty due to the increased bypass duct length, the stall margin of the fan is often reduced because low momentum rotor wake fluid migrates toward the outer casing while traversing the large interblade gap producing a region more susceptible to stall.

If the rotor vanes 50 in the bypass duct 52 of a turbofan engine 54 are provided with crenelations 56, the dissipation of the rotor wakes is greatly accelerated thereby permitting the gap, indicated at S, between the rotor 58 and the stator 60, to be reduced and will result in an increase in the stall margin.

Figure 7:
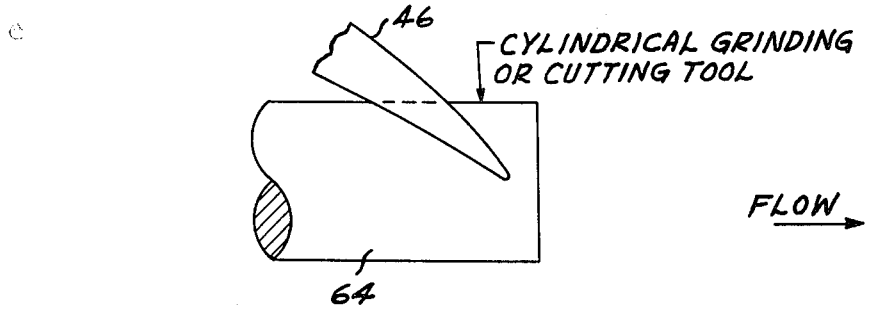
FIG. 7 is a schematic diagram showing a construction procedure for providing crenelations in the vane structure of FIGS. 5 and 6.
Figure 8:
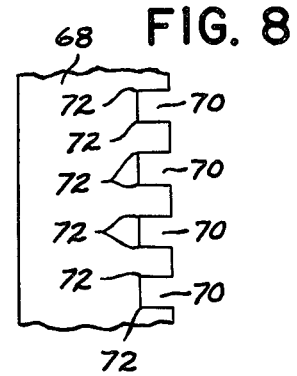
FIG. 8 shows a modified vane structure according to another embodiment of the invention.

One construction procedure that can be used for providing the crenelations in the rotor or stator vanes or other vane structure is shown in FIG. 7, wherein a cylindrical grinding or cutting tool 64 is positioned at a predetermined angle with respect to the cord of vanes 46 or 50 to provide eliptical shaped crenelations.

The crenelations can have other shapes than the curvilinear shapes shown in FIGS. 2, 4, 5 and 6. For example, vanes 68 having rectilinear crenelations 70 could be used. However, the curvilinear shapes are preferred since they avoid the use of corners 72, which reduces stress concentrations.

In the operation of the device the vane wakes such as indicated at 14 in FIG. 1 are re-energized by the mixing of the high momentum fluid streams with the low momentum fluid in the wake by the counterrotating vortices produced by the crenelations.

There is thus provided an apparatus for providing reenergization of the wake of a vane in a fluid stream.

I claim:

1. An aerodynamic system, comprising: an air flow duct; means for changing the direction of air flow within said duct; said means for changing the direction of airflow within said duct including a stationary vane in the form of an airfoil having a pressure surface and a suction surface; a diffuser downstream of said airfoil, with the wake of said airfoil passing through the diffuser; said airfoil including a plurality of crenelations in the downstream edge thereof for producing pairs of counter rotating vortices to provide rapid mixing of low momentum fluid in the wake with the adjacent fluid streams to re-energize the wake fluid, the width of said crenelations, the spacing between adjacent crenelations and the depth of the crenelations differing from each other by a factor of less than two; the depth of the crenelations being between 5 and 20 percent of the chord length of said airfoil.

2. The aerodynamic system as recited in claim 1 wherein said crenelations have a curvilinear configuration.

3. The aerodynamic system as recited in claim 2 wherein said air flow duct includes an elbow, upstream of the diffuser, with a plurality of said airfoils positioned in the duct within said elbow; and a plurality of said crenelations in the downstream edge of each of said airfoils.

4. The aerodynamic system as recited in claim 2 wherein said duct includes an axial flow compressor housing; a stator row, including a plurality of said airfoils, within the compressor housing; a plurality of said crenelations in the downstream edge of each of said stator row airfoils; a diffuser and a combustor having an inlet downstream of said stator row.

* * * * *